Sept. 16, 1941.    W. N. OLSON    2,255,983
SPEED CHANGER
Filed April 24, 1940    2 Sheets-Sheet 1

Inventor:
Waldemar N. Olson
By: Brayton Richards
Attorney.

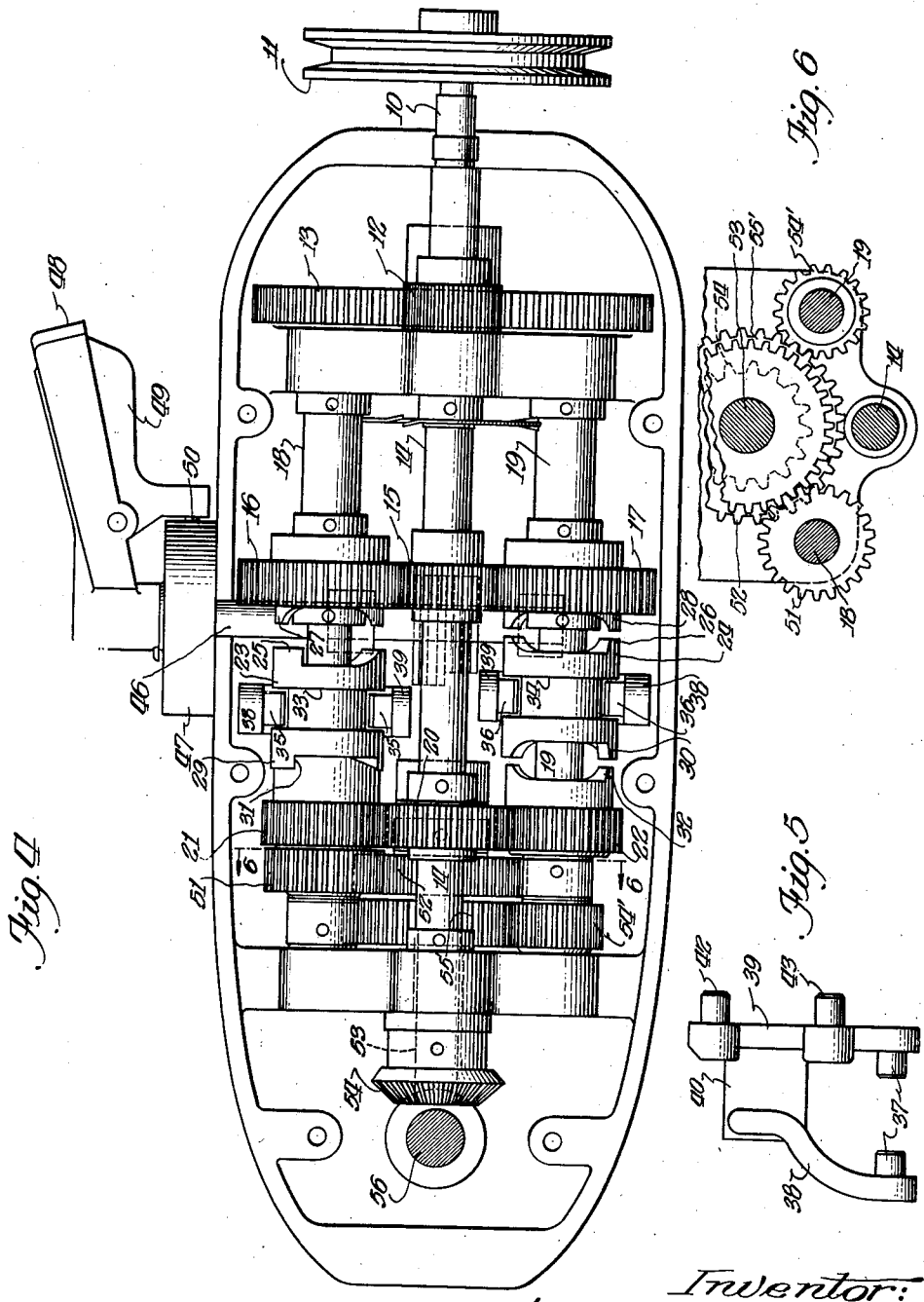

Patented Sept. 16, 1941

2,255,983

UNITED STATES PATENT OFFICE 2,255,983

SPEED CHANGER

Waldemar N. Olson, Brookfield, Ill., assignor to Reynolds Electric Co., Chicago, Ill., a corporation of Illinois Application April 24, 1940, Serial No. 331,334

1 Claim. (Cl. 74—337.5)

My invention relates to improvements in speed changers especially adapted for use in power driven food mixers or the like, the primary object of the invention being the provision of a speed changer providing a plurality of speeds which is of simple construction and highly efficient in use.

Other objects will appear hereinafter.

The invention consists of the combination and arrangement of parts hereinafter described and claimed.

The invention will be best understood by reference to the accompanying drawings forming a part of this specification, in which—

Figure 1:
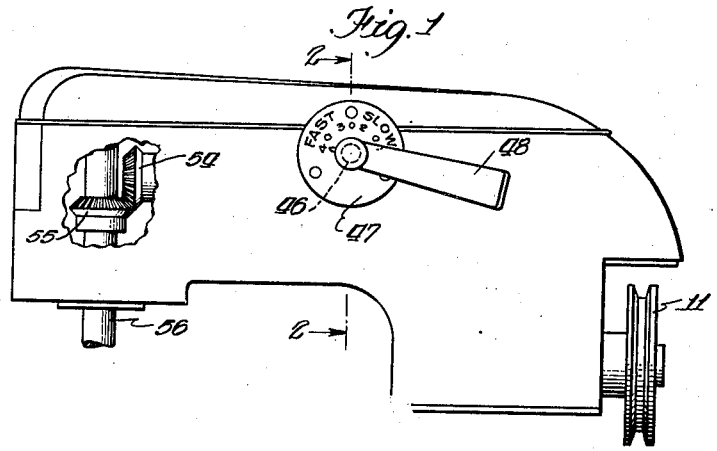
Figure 2:
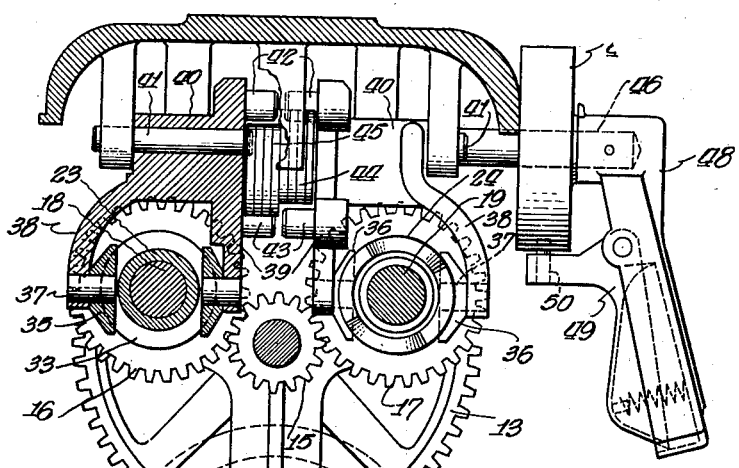
Figure 3:
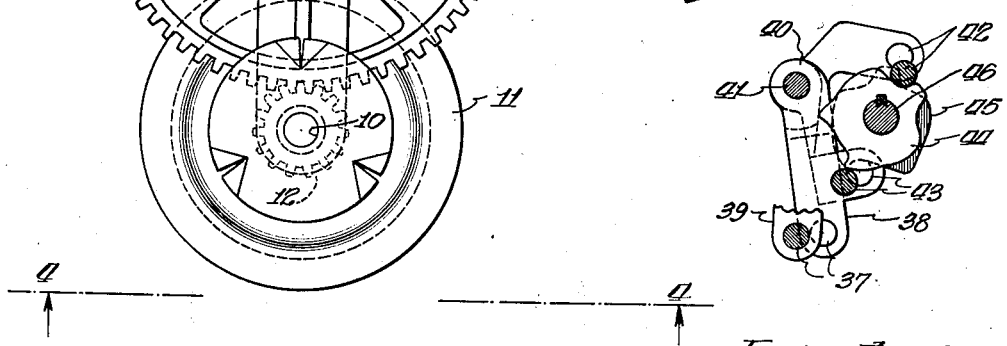

Figure 1 is a face view of speed changing mechanism embodying the invention;

Figure 2, an enlarged section taken substantially on line 2—2 of Figure 1, but showing the control handle in vertical position;

Figure 3, a detailed view illustrating two cams and their associated parts employed in the construction;

Figure 4, a bottom plan view taken substantially on line 4—4 of Figure 2;

Figure 5, a detailed view of a bell crank lever employed in the construction, and Figure 6, a section taken substantially on line 6—6 of Figure 4.

The embodiment of the invention illustrated in the drawings comprising a power shaft 10 deriving its power through a pulley 11 and transmitting power through a pinion 12 to a large gear 13 on the main drive shaft 14 of the mechanism. The drive shaft 14 carries the first pinion 15, fixed thereto and meshing with gears 16 and 17 loosely mounted respectively on countershafts 18 and 19 arranged as indicated in parallel relation to said drive shaft. A second pinion 20 is fixed to shaft 14 and meshes with gears 21 and 22 loosely mounted respectively on the countershafts 18 and 19. By this arrangement the gears on each countershaft will be driven at different speeds as will be readily understood.

Clutch members 23 and 24 are splined as indicated on shafts 18 and 19 and are equipped respectively on one of their ends with clutch elements 25 and 26 adapted and arranged to interlock with clutch elements 27 and 28 on the adjacent faces of the gears 16 and 17.

The other faces of the clutch members are provided with clutch elements 29 and 30 adapted and arranged to interlock with the clutch elements 31 and 32 on the adjacent faces of the gears 21 and 22. By this arrangement any one of the gears 16, 17, 21 and 22 may be locked to its corresponding countershaft by the shifting of the corresponding clutch, as will be readily understood.

The clutches 23 and 24 are provided with the usual central grooves 33 and 34 adapted to receive operating blocks 35 and 36 carried by pivot pins 37 as indicated. The pins 37 are carried by curved arms 38 and straight arms 39 of similar bell cranks 40 which are fulcrumed at 41 in suitable supporting brackets as shown, the arrangement being such that by rocking the bell cranks 40 on their fulcrum pins 41, the clutches 23 and 24 may be shifted to lock the gears 16, 17, 21 and 22 selectively to their respective countershafts as will be readily understood.

Each of the bell cranks 40 carries two contact pins 42 which are arranged on diametrically opposite sides of cams 44 and 45 on control shaft 46, as indicated.

As shown, the cams 44 and 45 are shaped to rock or shift the bell cranks 40 so as to throw or lock the gears 16, 17, 21 and 22 selectively to their respective countershafts as the control shaft 46 is continuously rotated, as will be readily understood. The control shaft 46 carries a control handle 48 which in turn carries a spring detent 49 equipped with a lock pin 50 adapted and arranged to engage suitable notches in the periphery of an index plate 47 surrounding the said shaft 46 as shown, and whereby said shaft 46 will be locked in its various positions of adjustment with one of the gears 16, 17, 21 or 22 locked to its respective countershaft.

The pinion 51 is fixed to countershaft 18 and meshes with the gear 52 fixed to drive shaft 53. A pinion 54' which is smaller than the pinion 51 is fixed to the countershaft 19 and meshes with the gear 55' fixed to the drive shaft 53, whereby different speeds of rotation will be transmitted to the drive shaft 53 when each of the gears 16, 17, 21 and 22 is locked to its respective countershaft, as will be readily understood. Drive shaft 53 carries a bevel gear 54 meshing with bevel gear 55 on a vertical shaft 56 as shown, whereby the four speeds transmitted to the drive shaft 53 will in turn be transmitted to the shaft 56. The shaft 56, in the mechanism illustrated, is connected by a suitable gear, not shown, with the mixer or beater of a food mixing or beating mechanism or the like, whereby the four different speeds imparted to the drive shaft 53 will be imparted to the mixer or beater, as will be readily understood.

By this arrangement a speed changer is provided especially adapted for use in food mixing or beating mechanisms, or the like, which is of simple construction, comparatively noiseless in operation, and in which a plurality of speeds may be readily transmitted to the operated mechanism by the continuous movement or manipulation of the control shaft.

The specific combination and arrangement of parts disclosed constitutes a simple and effective construction for the purpose.

While I have illustrated and described the preferred form of construction for carrying my invention into effect, this is capable of variation and modification without departing from the spirit of the invention. I therefore do not wish to be limited to the precise details disclosed, but desire to avail myself of such variations and modifications as fall within the scope of the appended claim.

I claim:

A speed changer comprising two clutch members and associated gears arranged to provide four different speeds by shifting of said clutch members; two spaced bell crank levers, each having one arm operatively connected with one of said clutch members; a control shaft in operative association with said levers; two adjacent cams on said control shaft projecting between said levers; and two pins on each lever contacting with diametrically opposite sides of the adjacent cam, said cams being so shaped as to cause selective operation of said clutches to produce said four different speeds by continuous rotation of said control shaft.

WALDEMAR N. OLSON.